April 21, 1959  J. H. O. HARRIES  2,883,576
THERMIONIC VALVES
Filed April 4, 1955
3 Sheets-Sheet 1
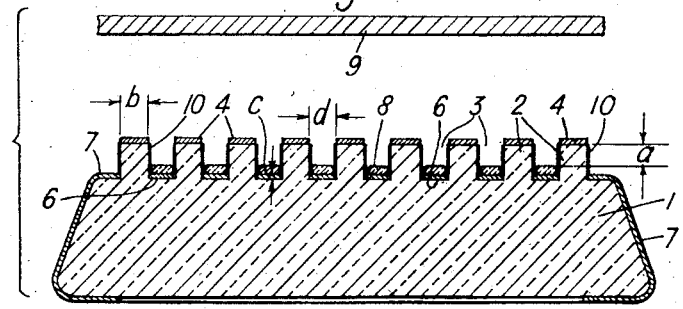
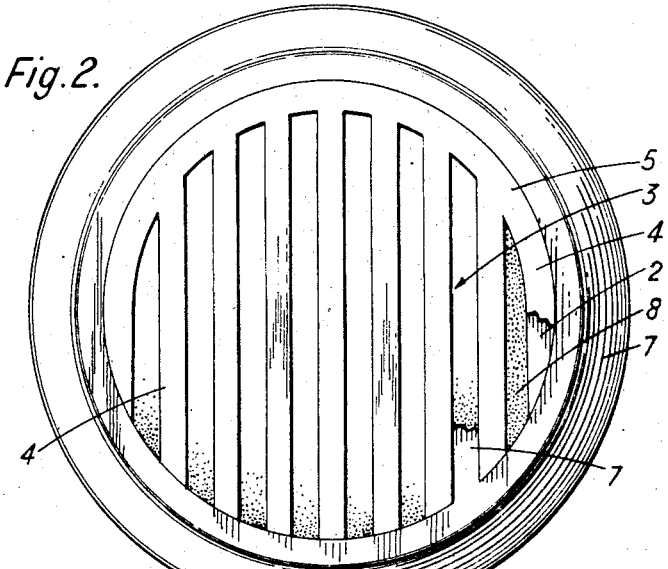
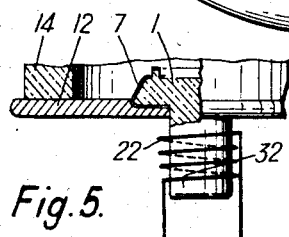
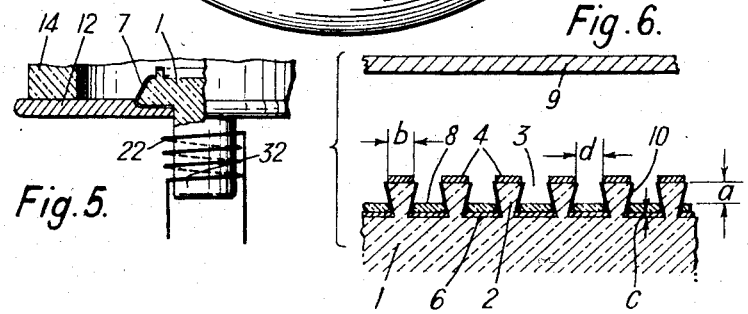
Inventor
John H. O. Harries
By Ralph B. Stewart
Attorney April 21, 1959   J. H. O. HARRIES   2,883,576
THERMIONIC VALVES Filed April 4, 1955   3 Sheets-Sheet 2

Inventor
John H. O. Harries
By Ralph B. Stewart
Attorney

April 21, 1959  J. H. O. HARRIES  2,883,576
THERMIONIC VALVES
Filed April 4, 1955  3 Sheets-Sheet 3
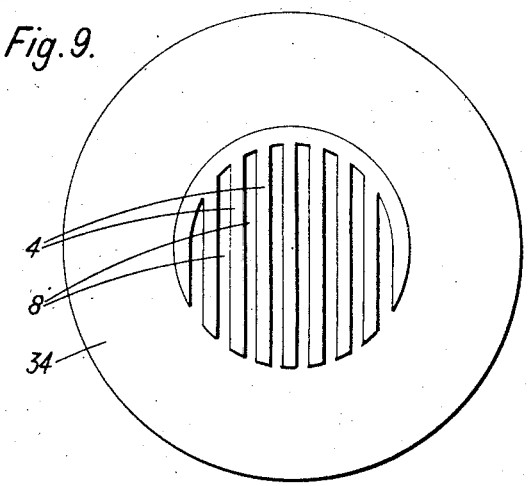
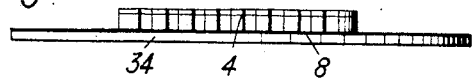
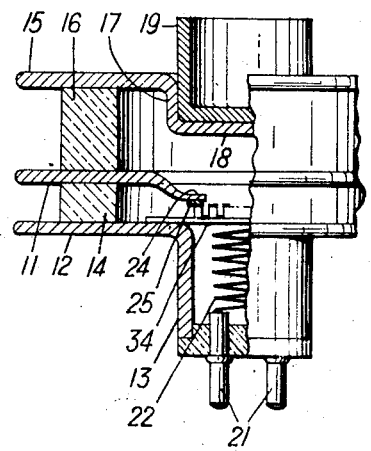
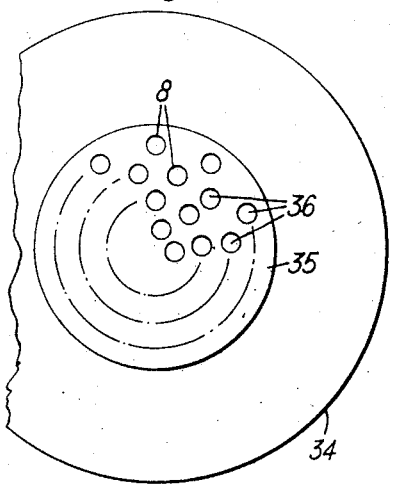
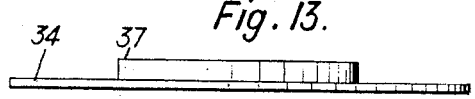
Inventor
John H. O. Harries
By Ralph B. Stewart
Attorney

United States Patent Office 2,883,576
Patented Apr. 21, 1959

2,883,576

THERMIONIC VALVES

John Henry Owen Harries, Warwick, Bermuda, assignor to General Electric Company, a corporation of New York Application April 4, 1955, Serial No. 499,106

17 Claims. (Cl. 313—257)

This invention relates to vacuum or gas-filled thermionic valves or electron discharge tubes, and is particularly concerned with the arrangements for controlling the electron flow in such devices. In many electron discharge tubes previously made, the electron flow from the cathode is controlled in magnitude or direction or both by means of potentials applied to a metal wire control grid placed between the cathode and the anode or anodes. Such devices, however, have the disadvantage that if a control potential of an extremely high frequency is applied to the control grid, the control is relatively ineffective. This disadvantage may be reduced to a minimum by employing a grid of very fine wires with a very close mesh, and with the space between the grid and the cathode also very small. However, these very fine dimensions give rise to very serious manufacturing and mechanical difficulties and consequently make the manufacturing cost very high. Thus, in practice, electron discharge tubes with wire control grids are either very costly or are only useful at relatively low frequencies. Another disadvantage of the usual form of discharge tube is that the control grid and cathode structure is fragile and liable to disturbance and damage due to mechanical vibration and shock. Such tubes have a further disadvantage that if the control grid is placed very close to the cathode, the result is that the electric field near the cathode becomes very uneven and the effectiveness of the control otherwise obtainable is reduced and the electron stream is very uneven.

In the main, the present invention aims at avoiding or reducing these disadvantages, and its object is chiefly to provide a robust discharge tube with the elements very closely spaced so that the device can be employed with ultra-high frequencies applied to the control electrode, and yet the tube noise is reduced in relation to the gain of the valve. Discharge tubes operated at such high frequencies have a number of applications, in particular for use in front-end amplifiers in television receivers. Triodes owing to their relative simplicity are desirable for use in this way but, as already indicated, the manufacturing problem of using metal wire control grids involves considerable difficulty.

Therefore, according to the present invention the cathode and control element structure for a thermionic valve or electron discharge tube includes at least two electrically conductive members, sub-divided and interpositioned and spaced apart by being secured to a support of electrically-insulating or semi-conducting material; one of such members is provided with a coating of an electron-emissive material and another of such members forms a control electrode or electrodes. These conductive members may conveniently take the form of strips interlaced so as in fact, to form flat grids or combs, the prongs of which interfit. In the simplest case, there are two sets of such conductive members but there may be more than two; for example in addition to the cathode member there may be two or more control grids, and, in addition, one or more anodes each consisting of a set of such members. However, in the simplest case, the anode may be a plain plate spaced away from the face of the support and from the cathode strips and the control strips. The cathode and control element structure is mounted in a usual form of envelope with the anode or anode system, and the envelope may be a vacuum envelope or gas-filled. Indeed, the support of the cathode and control element structure may be employed as part of the wall of the envelope. The tube, of course, requires a heater for the cathode strip which may be located on the opposite side of a wall of the support to the face which carries the cathode and control strips. The heater may be within the vacuum or gas space in the envelope but, on the other hand, it may be in a cavity in the support which is open to the external atmosphere.

It is convenient to place the cathode strips in a recess in the face of the electrode support, which recess may take the form of individual grooves, and the control electrode strips can be carried on the ridges between adjacent grooves so as to be raised above the general surface of the face of the support. The grooves may be trough-shaped depressions with parallel side walls, or the depressions may be undercut so as to be wider at the bottom than at the top of each trough, so introducing a tendency to focus the electrons emitted from the cathode strip into homogeneous beams so as to provide a good control characteristic and low electrical noise level.

It has sometimes been found desirable to coat the surface of the face of the support lying between adjacent strips with a conductive coating of sufficiently high resistance to avoid short-circuiting the two sets of strips having regard to the input impedance of the input circuit with which the tube is to be used, but, at the same time, of sufficiently low resistance to prevent the establishment of electrical charges on the surface between the strips, and also so as to form and define the field between the two or more sets of strips.

It will be appreciated at this stage that, in accordance with the invention, a structure may be produced with very small separation between the emissive cathode strips and the control strips, and the structure can therefore be made so that a discharge tube can be operated without difficulty at extremely high frequencies. Furthermore, the structure as a whole can be made very robust and the operation of the tube in which it is incorporated will not be readily disturbed even by very violent mechanical vibrations and shock.

In order that the invention may be more clearly understood and readily carried into practice, some examples of electron discharge tubes constructed in accordance with the invention, will now be more fully described with reference to the accompanying drawings, in which:

Figure 1 is a diametral vertical section of a cathode and control grid unit for a discharge tube according to the invention, with a plate anode shown diagrammatically in position;

Figure 2 is a plan of same with parts broken away for clearness of illustration;

Figure 5 is a fragmentary elevation partly in section of the lower part of a discharge tube showing a further small modification;

Figure 6 is a diametral vertical section similar to Fig. 1 showing a small modification of the electrode unit.

Figure 8 is a fragmentary diametrical vertical section of yet a further form of the cathode and control grid unit; while Figure 9 is a plan; and Figure 10 is a complete elevation of same;

Figure 11 is an elevation half in diametral vertical section of a form of the novel discharge tube furnished with an electrode unit as shown in Figs. 8 to 10;

Figure 12 is a plan of still a further modification of the electrode unit; and

Figure 13 is a side elevation of same.

Figure 3:
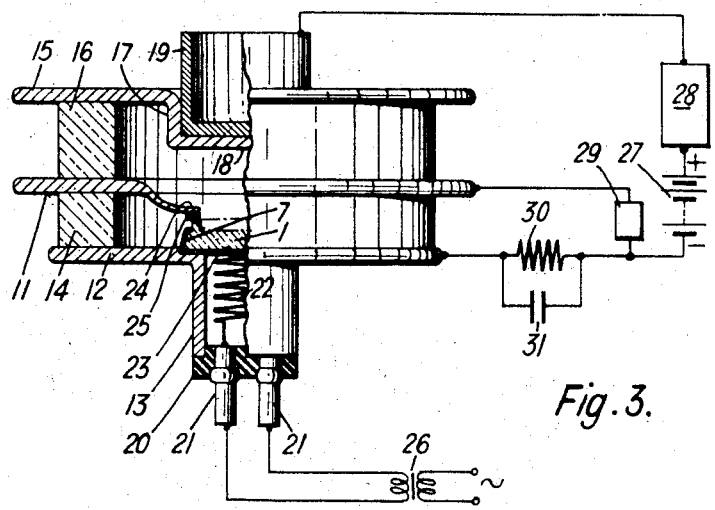
Figure 3 is an elevation partly in diametral vertical section of a discharge tube fitted with the parts shown in Figs. 1 and 2 and including a diagram of simple suitable external circuits.

Referring first to Figs. 1 and 2, the cathode and control grid unit shown comprises a base or support 1 of electrical insulating or semi-conducting material such as ceramic material formed on its upper surface with a series of parallel ridges 2 so as to form a series of troughs 3 between adjacent ridges running across the face of the base 1. A set of electrically-conductive strips 4 are supported on the upper faces of the ridges 2 and are connected by a rim portion 5 so as to constitute a control grid. A second set of electrically-conductive strips 6 are located at the bottoms of the troughs 3 and are continued to form an annular conductive coating and shell 7 extending around the rim of the electrode and the side of the base 1. The strips 6 are coated with an electron-emissive coating 8. The strips 4 are spaced and insulated from the strips 6 by the vertical surfaces of the insulating or semi-conducting ridges 2. In Figs. 1 and 2, the size of the troughs 3 and strips 4 and 6 has been exaggerated for the sake of clarity but in practice, the ridges 2 will be much smaller and there will be a much greater number of them on the faces of the base 1.

In Fig. 1, the metal plate anode is indicated at 9. The emissive surface coating 8 on the strips 6 consists of a layer of one of the usual cathode coatings, such as a carbonate of an alkaline earth metal. It is sometimes desirable to coat the surface of the insulating base 1 which lies between adjacent strips 4 and 6 with a conductive coating 10 of sufficiently low resistance to prevent the establishment of electrical charges on the surface between the strips 4 and 6. However, the coating 10 should not have sufficiently low resistance to short-circuit the strips 4 and 6 having regard to the input impedance of the circuit with which the electron discharge tube is to be used.

Referring now to Fig. 3, the electrode unit with its base shown at 1 is held rigidly between metal discs 11, 12 of which the latter is shaped with a central tubular extension 13. These discs are spaced apart and insulated from each other by a ceramic insulating ring 14. A further metal disc 15 is spaced and insulated from the disc 11 by a further ceramic ring 16. The disc 15 is shaped with a depressed central portion 17, the inner surface 18 of which forms the anode corresponding to the member 9 in Fig. 1 and the central depression receives a cylindrical anode terminal 19. The tubular extension 13 of the lower disc 12 is closed by a ceramic plug 20 into which the terminals 21 for the heat coil 22 are sealed.

The ceramic parts 14, 16 and 20 are cemented to the metal parts 11, 12, 15 and 21 to yield a vacuum-tight envelope. The air may be exhausted from this envelope, the internal parts simultaneously de-gassed and finally cemented together by the well-known method of placing the assembly in a vacuum under a bell-jar from which the air is exhausted and applying pressure along the axial direction as seen in Fig. 3.

The electrode unit has its base 1 in Fig. 3 resting in a shallow recess 23 in the disc 12 so that the disc 12 is in electrical contact with the metal shell 7 shown in Figs. 1 and 2 which extends around the rim of the electrode unit. The disc 12 in Fig. 3 is therefore electrically connected with the cathode strips 6 seen in Figs. 1 and 2. The ring 11 has a springy inner edge 24 which presses down on the upper surfaces of the ridges 2 so that the ring 11 is in electrical contact with the control grid strips 4. A ring 25 of soft metal such as copper is shown interposed between the strips 4 and the springy edge 24 of the ring 11 so as to improve the contact between them. Alternatively, however, the springy edge 24 may be soldered to the strips 4 during the heating and exhausting process under the bell-jar mentioned above.

The electrode unit is heated to cause the electron-emissive coating 8 of the cathode strips 6 to emit electrons by passing a heater current through the helical coil 22 which is of resistive material. In Fig. 3 as in Figs. 1 and 2 the size of the troughs and interleaved conductive strips has been exaggerated for the sake of clarity.

The electron discharge tube shown in Fig. 3 may be utilized in a circuit in the usual way but, by way of example, the coil 22 is shown as heated by an alternating current from the secondary winding of a transformer 26. The anode terminal 19 is shown connected to the positive pole of an anode source of potential 27 through an anode load circuit shown in block form at 28. The disc 11 and therefore the control grid strips 4 shown in Figs. 1 and 2 are connected to the disc 12 through an input circuit shown in block form at 29 and through a resistance 30 and capacitance 31 connected in parallel. The anode current passing through the resistance 30 provides the negative bias voltage for the control grid strips 4 with respect to the ring 12 and thus with respect to the cathode strips 6. Thus the discharge tube connected into circuit as shown in Fig. 3 forms a thermionic amplifier.

It will be appreciated at this stage that the present invention provides an electron tube structure with a very small separation between the emissive cathode strips 6 and the control grid strips 4 as shown particularly in Fig. 1 and therefore the structure can be made so that the discharge tube can be operated without difficulty at extremely high frequencies. Furthermore, the structure as a whole can be made very robust and the operation of the discharge tube in which the electrode structure is incorporated will not be readily disturbed even by very violent mechanical vibrations and shock.

Figure 4:
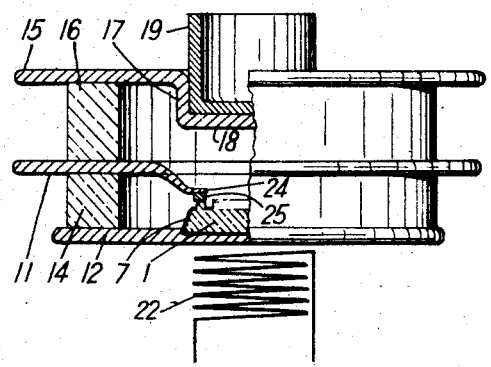
Figure 4 is a similar view of a modified form of the discharge tube.

In the form of discharge tube shown in Figure 4, the construction differs from that shown in Fig. 3 in that the heater coil 22 is situated outside the vacuum-tight envelope instead of inside the envelope. Now, the metal disc 12 which supports the electrode unit and is in electrical contact with the cathode strips 6 also conducts heat from the heat coil 22 to the electrode unit and the cathode strips. The operation of the tube shown in Fig. 4 in a circuit is the same as that of the tube shown in Fig. 3.

In the modification shown in Fig. 5, an extension 32 of the base 1 protrudes through the metal disc 12 so that this extension is heated directly by the heater coil 22 which encircles it.

In Fig. 6, the electrode structure is shown modified by making troughs 3 between the ridges 2 on the upper surface of the base 1 so that they are undercut and are wider at the bottom than at the top with the result that an improved control characteristic is obtained.

Figure 7:
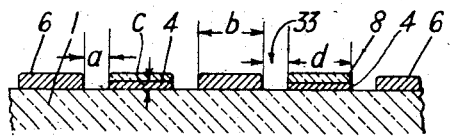
Figure 7 is a diametral vertical section showing a further modification of the cathode and control grid unit.

In Fig. 7, the ridges 2 seen in Fig. 1 are omitted and instead, the cathode strips 4 bearing the emissive coating and the control grid strips 6 are interleaved and supported on the upper surface of the base 1 which is now plane. The controlling action is not so good in the arrangement shown in Fig. 7 as it is with that of the structure in Figs. 1 and 2 but nevertheless the structure in Fig. 7 is simpler. The degree of control may be varied by changing the spacing 33 between neighbouring strips and the widths of the strips 4 and 6.

Figure 8:
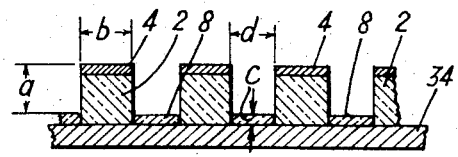

In another modification of the electrode unit as shown in Figs. 8 to 10, the base 1 is replaced by a metal plate 34 on the upper face of which ridges 2 made of insulating or semi-conducting material are secured. The control grid strips 4 are placed on the tops of the ridges 2 as in the cases of Figs. 1 and 6 and the emissive cathode surface 8 is interposed between the ridges 2.

In Fig. 11, an electron discharge tube is shown similar to that shown in Fig. 3 but in which the electrode unit provided is of the form shown in Figs. 8 to 10. The tube differs from that shown in Fig. 3 in that the metal base plate 34 is directly affixed to the upper face of the ring 12 and thereby the cathode strips are electrically connected to the ring 12. Otherwise, the parts are as in Fig. 3 and bear corresponding reference numerals.

In Figs. 12 and 13, a modified form of electrode unit is shown in which the ridges 2 are replaced by a disc 35 of electrically insulating material which is perforated, the perforations 36 corresponding to the troughs 3 between the ridges 2 in Fig. 1. In each perforation 36, an electron-emissive surface 8 is located and, as the disc 35 is placed on a metal base plate 34, the surfaces 8 forming the cathode are in direct electrical contact with the base plate 34. The control grid consists of a thin metal layer 37 carried on the upper surface of the disc 35. It will be appreciated that the apertures 36 need not be circular but these apertures or the troughs 3 may be of other shapes such as rectangular apertures or concentric troughs with the cathode strips and the control grid strips of corresponding shapes.

The form of tube shown in Fig. 11 may be modified by placing the heater coil 22 outside of the vacuum envelope in the manner shown in Fig. 4 but with the metal base plate 34 forming part of the wall of the vacuum envelope.

The semi-conducting or electrically-insulating material used in the control elements, such as those described with reference to the drawings, can best consist of a ceramic material or of a glass, or of one of the materials the properties of which lie between those of ceramic and glass such as the glass sold by the Corning Glass Co. of Corning, New York, U.S.A. under the trade name of "Foto-Ceram." In those cases where the ridges and troughs are sufficiently large in dimensions, they can be cut by ordinary mechanical means such as the use of a fine circular saw or a scribing tool. Both glass and ceramic materials can be shaped in this way. An alternative method is to mould the materials.

It has already been pointed out that one of the useful properties of a discharge tube according to the invention is that an extremely small spacing is possible between the control elements and the cathode elements (4, 6 and 8 in Figure 1). These very small dimensions cause considerable difficulty in forming the ridges or troughs by mechanical cutting or scribing; but nevertheless are particularly applicable to discharge tubes required for use at very high frequencies for which the invention is especially suitable although of course the invention is also applicable to discharge tubes for operating at lower frequencies. In the case of very high frequency operation, the very small troughs in such control elements as those illustrated in Figures 1, 2 and 6 can be formed by well known photo-etching techniques. In order to bring home the exceedingly fine dimensions required for the cathode and control element structure for operation at very high frequencies typical dimensions $a$, $b$, $c$ and $d$ (Figures 1, 6, 7 and 8) suitable for very high frequency operation may be quoted. Thus in Figures 1, 6 and 8 the dimensions $a$, $b$ and $d$ may each be 0.001 inch; and in Figure 7, the dimension $a$ may be 0.0005 in. and the dimensions $b$ and $d$ may be 0.001 inch. The distance from the face of the electrically conductive strips 4 to the face of the anode 9 may be 0.020 inch.

The material chosen for the semi-conducting or insulating part of the control element must, therefore, be one suitable for photo-etching in those cases where very small dimensions are to be used for very high frequency operation. Such materials are glass with a high silica content and "Foto-Ceram" glass mentioned above. Some other materials, including most ceramics, are particularly suitable when the dimensions are sufficiently large for the material to be formed by mechanical cutting. Many ceramic materials can not, however, be photo-etched.

The material used must be suitable for operation in a discharge tube at the emission temperature of say, 800° C. and must have certain other properties so that it is suitable for use in a vacuum tube such as not poisoning the cathode emission surface.

In the case of the control element illustrated in Figures 8, 9 and 10, the insulating or semi-conducting material forming the ridges 2 can be in the form of a glass or ceramic which is applied to the base 34 by a stencilling process, the stencil itself being produced by a photo-etching process if the dimensions are small enough to warrant this. The glass or ceramic is then fired onto the metal base.

The metal conductive strips 4 and 6 in Figures 1, 2, 6 and 7 and the strips 4 in Figures 8, 9 and 10 may be positioned by the known methods of photo-printing (such as are used in the production of printed circuits) and may be stencilled or painted into position, and subsequently fired onto the ceramic or glass surface, in the case of dimensions which are not too small to preclude the use of stencilling and painting methods.

It will be realised that by the use of photo-etching and photo-printing methods, the necessary configurations can be produced by the projection of optical images of large size master transparencies and that the smallness of the troughs and metal strips is limited only by the grain of the material used and by the performance of the optical systems and acid-etching baths used.

The metal strips or coatings may be applied to the element in the form of a thin film of metal, which may be a noble metal such as silver or platinum, and may be fired unto the face of the support by heating the latter up to the point of incipient softening in the case of glass.

The metal may be thickened and strengthened by electrolytic deposition of further metal. In the case of the cathode metal 6, the metal applied, or used to thicken the deposit as above can be nickel for the sake of its good properties as a base for the cathode-emitting material 8. The metal used for, or deposited upon the control surface 4 to thicken it can be chosen to inhibit emission, as far as possible.

Another way of applying a metal coating, and, in particular, the conductive coating 10 in Figures 1 and 6 is to evaporate the metal in a vacuum.

The cathode emissive material 8 in Figures 1, 6, 7 and 8 may be applied to a controlled thickness by an automatic spraying machine and a stencil or mask may be employed to protect the other parts of the element from the coating process. This stencil can be produced by photo-etching. The coating process may be assisted by electrically charging the cathode strips 6 and the control strips 4 as is often the practice when accurate controlled coatings are required. As an alternative, an electrophoretic process can be used which would take advantage of the fact that a coating material is then only deposited on parts which are positively charged.

I claim:

1. A cathode and control element structure for a thermionic valve or electron discharge tube comprising at least two electrically-conductive members which are subdivided and interpositioned and are spaced apart by being secured to spaced surfaces of a support of high resistivity material, one of said conductive members being provided with a coating of an electron-emissive cathode material and another of said members comprising a control element, and said support having conductive surface portions between said electrically-conductive members which have an electrical resistance effective for dissipating electrical charges tending to accumulate thereon but ineffective for short-circuiting said cathode and control element during operation.

2. A cathode and control element structure according to claim 1, wherein the conductive members each comprise a plurality of flat strips, the strips of each of said members being interpositioned between the strips of the other of said members.

3. A cathode and control element structure according to claim 1, wherein one surface of the support comprises upstanding ridges with intervening troughs and with said control element carried on the upper surfaces of said ridges and said cathode material located in said troughs completely below the surfaces of said ridges.

4. A structure according to claim 1, wherein said support comprises a metal base having ridges of high resistivity material upstanding from its surface, said cathode material is supported directly on and in electrical contact with said metal base between said ridges, said control element is carried on said ridges, and said conductive surface portions for dissipating electrical charges are on the side walls of said ridges intermediate said cathode material and said control element.

5. A structure according to claim 1, wherein said support comprises a metal base on which a plate of high resistivity material is carried, said plate includes apertures passing therethrough to said metal base to receive parts of the cathode member which are in contact with and electrically connected with said metal base and said control element is carried on the outer surface of the said plate, and said conductive surface portions for dissipating electrical charges comprise the wall portions of said apertures intermediate said cathode material and said control electrode.

6. A cathode and control element structure according to claim 3, wherein a further set of strips is carried on the surface of the support to be connected to operate as an anode.

7. A thermionic valve or electron discharge tube comprising an envelope, a cathode and control element structure according to claim 1, mounted within said envelope in spaced parallel relation to a planar anode and a heater for said cathode material.

8. An electrode structure comprising a single base member of high resistivity material including a plurality of spaced elongated upstanding portions, a conductive coating on said base member including a plurality of interconnected portions extending into the regions between said upstanding portions and spaced completely below the upper surfaces of said upstanding portions, and another conductive coating extending completely across the upper surfaces of said portions, said conductive coatings being vertically spaced and electrically insulated from each other by said upstanding portions and operable at substantially different electric potentials.

9. An electrode structure comprising a base including a plurality of spaced upstanding portions of insulating material, a conductive coating on said base extending into the regions between said ridges and spaced completely below the upper surfaces of said ridges, a conductive coating extending completely across the upper surfaces of said ridges, said conductive coatings being vertically spaced from each other by said ridges and operable at substantially different electric potentials, and a conductive material of substantially high resistivity relative to said conductive coatings extending across the lateral surfaces of said ridges and connecting said conductive coatings, thereby to effect a substantially uniform potential gradient therebetween.

10. An electrode structure comprising a base of insulative material including a plurality of parallel ridges defining a plurality of intervening troughs, a conductive member including a plurality of electrically interconnected elongated portions extending in said troughs and secured throughout the lengths of said elongated portions to the surface portions of said base in said troughs, a coating of electron emissive material on said elongated portions of said conductive member and spaced completely below the outermost surfaces of said ridges, and another conductive member including a plurality of electrically interconnected elongated portions secured throughout the lengths thereof to the outermost surfaces of said ridges, said conductive members being fixedly vertically spaced and mutually insulated by said ridges.

11. An electrode structure comprising a base including a plurality of parallel ridges of insulating material defining a plurality of intervening troughs, a conductive member including elongated portions extending in said troughs and secured throughout the lengths of said elongated portions to said base, a coating of electron emissive material on said elongated portions of said conductive member and spaced completely below the outermost surfaces of said ridges, another conductive member including elongated portions secured throughout the lengths thereof to the outermost surfaces of said ridges, and the lateral portions of said ridges being undercut and bearing a conductive coating of substantially high resistivity relative to said conductive members, thereby to effect predetermined focusing fields in said troughs.

12. An electron discharge device comprising an envelope, an anode in said envelope and a cathode and control element structure mounted in said envelope in spaced insulated relation to said anode, said structure comprising a support including a plurality of spaced upstanding portions of high resistivity material extending toward said anode and defining a plurality of intervening depressions opening toward said anode, a conductive cathode base member including portions extending in said depressions and fixedly secured to said support, a coating of cathodic material on said portions of said cathode base member extending in said depressions and spaced completely below the upper surfaces of said upstanding portions, a conductive control elecent including portions fixedly secured to said upper surfaces of said upstanding portions intermediate said anode and cathodic material, said support being heatable to render said cathodic material emissive, and mutually insulated means for effecting electrical connections to said anode, cathode base member and control element.

13. An electron discharge device comprising an envelope, a planar anode in said envelope, and a planar cathode and control element structure mounted in said envelope in spaced parallel insulated relation to said anode, said structure comprising a single insulative support member including a plurality of parallel spaced ridges upstanding toward said anode and defining a plurality of troughs opening toward said anode, a metallic coating on said support including elongated portions serving as a cathode base and secured to said support member in the bottoms of said troughs, a coating of cathodic material on said cathode base and spaced completely below the upper surfaces of said upstanding portions, another metallic coating including elongated portions serving as a control element and secured to the said upper surfaces of said ridges adjacent said anode, said cathode base and control element being vertically spaced and mutually insulated by said ridges, means for heating said support to render said cathodic material emissive, and means for effecting electrical connections to said anode, cathode base and control element.

14. An electron discharge device as in claim 13, including a conductive coating of substantially high resistivity relative to said metallic coatings connecting said metallic coatings across the lateral portions of said ridges, thereby to effect a substantially uniform potential gradient between said metallic coatings.

15. An electron discharge device as in claim 14, wherein the spacing of the opposed lateral portions of adjacent ridges increases toward said cathode base, thereby to effect predetermined focusing fields between said ridges.

16. An electrode structure comprising a single base member of high resistivity material including a plurality of spaced parallel elongated upstanding portions and a transverse upstanding portion at only one side of said spaced member interconnecting the corresponding ends of said parallel upstanding portions, and a pair of interdigital conductive coatings, one of said coatings including a plurality of portions carried on the surface portions of said base member intermediate said parallel upstanding portions and electrically interconnected on the surface of said base member opposite said transverse upstanding portion, and the other of said coatings being carried on the upper surfaces of said upstanding portions with the portions of said coating on said parallel upstanding portions being electrically interconnected by the portion of said coating on said transverse upstanding portion, and said coatings being mutually electrically insulated by the material of said upstanding portions.

17. An electron discharge device comprising an envelope structure including a plurality of insulative and conductive wall sections, an anode in said envelope connected to one of said conductive wall sections and a cathode and a control element structure mounted in said envelope in spaced insulative relation to said anode, said structure comprising a single support member of high resistivity material including a plurality of elongated parallel ridges interconnected at corresponding ends by a transverse ridge, a metallic coating on said support member including a plurality of elongated portions carried on the surface portions of said support members between said ridges, a coating of cathode material on said elongated portions of said metallic coating, a second metallic coating including portions on the upper surfaces of said elongated and transverse ridges and spaced and insulated from said first coating by said ridges for service as a control element, and said metallic coatings each engaging one of said conductive wall sections of said envelope whereby the latter are adapted for making electrical connections to said cathode and control element.

References Cited in the file of this patent

UNITED STATES PATENTS

| | | |
|---|---|---|
| 1,904,436 | Franklin | Apr. 18, 1933 |
| 1,941,687 | Hunter | Jan. 2, 1934 |
| 1,961,192 | Bowles | June 5, 1934 |
| 2,068,287 | Gabor | Jan. 19, 1937 |
| 2,099,531 | Passarge | Nov. 16, 1937 |
| 2,197,753 | Liebmann | Apr. 23, 1940 |
| 2,254,095 | Thompson | Aug. 26, 1941 |
| 2,462,921 | Taylor | Mar. 1, 1949 |
| 2,512,858 | Hegbar | June 27, 1950 |
| 2,618,690 | Stuetzer | Nov. 18, 1952 |

FOREIGN PATENTS

| | | |
|---|---|---|
| 115,700 | Great Britain | May 21, 1918 |